United States Patent
Kraft et al.

[19]

[11] Patent Number: 6,120,563
[45] Date of Patent: Sep. 19, 2000

[54] METHOD FOR PROVIDING A FLAT-FOLDED, MULTI-PLATE ELECTRODE ASSEMBLY

[75] Inventors: Glenn Kraft, Akron; Deborah Czamara, Medina, both of N.Y.

[73] Assignee: Wilson Greatbatch Ltd., Clarence, N.Y.

[21] Appl. No.: 09/110,646

[22] Filed: Jul. 6, 1998

Related U.S. Application Data

[62] Division of application No. 08/885,085, Jun. 30, 1997, Pat. No. 5,776,628.

[51] Int. Cl.[7] .............................. H01M 6/16; H01M 6/02
[52] U.S. Cl. ...................... 29/623.1; 429/127; 429/161; 429/94
[58] Field of Search .................... 429/126, 94, 127, 429/161, 162; 29/623.1

[56] References Cited

U.S. PATENT DOCUMENTS

| | | | |
|---|---|---|---|
| 418,483 | 12/1889 | Woolf . | |
| 2,422,045 | 6/1947 | Ruben | 136/107 |
| 2,519,053 | 8/1950 | Reinhardt | 136/111 |
| 2,667,527 | 1/1954 | Pucher | 136/90 |
| 2,928,888 | 3/1960 | Vogt | 136/6 |
| 3,239,380 | 3/1966 | Berchielli | 136/6 |
| 3,494,796 | 2/1970 | Grulke et al. | 136/83 |
| 3,530,001 | 9/1970 | Harivel | 136/3 |
| 4,051,304 | 9/1977 | Snook | 136/6 |
| 4,332,867 | 6/1982 | Tsuda et al. | 429/94 |
| 4,383,011 | 5/1983 | McClelland et al. | 429/54 |
| 4,830,940 | 5/1989 | Keister et al. | 429/194 |
| 5,154,989 | 10/1992 | Howard et al. | 429/160 |
| 5,434,017 | 7/1995 | Berkowitz et al. | 429/94 |
| 5,439,760 | 8/1995 | Howard et al. | 429/94 |
| 5,443,925 | 8/1995 | Machida et al. | 429/94 |
| 5,525,441 | 6/1996 | Reddy et al. | 429/127 |
| 5,667,909 | 9/1997 | Rodriguez et al. | 429/127 |
| 6,045,943 | 4/2000 | Nowaczyk | 429/160 |

*Primary Examiner*—John S. Maples
*Attorney, Agent, or Firm*—Hodgson Russ Andrews Woods & Goodyear LLP

[57] ABSTRACT

A method of making a multi-plate wound cell assembly constructed similar to a conventional jellyroll electrode assembly except that each electrode comprises a series of plates spaced along a continuous current collector, and the plates are flat-folded rather than wound into a cylinder, is described. The length of the current collector between adjacent plates of the anode and cathode electrodes increases as the folding progresses to allow for the increase as the electrode assembly is flat-folded.

12 Claims, 2 Drawing Sheets

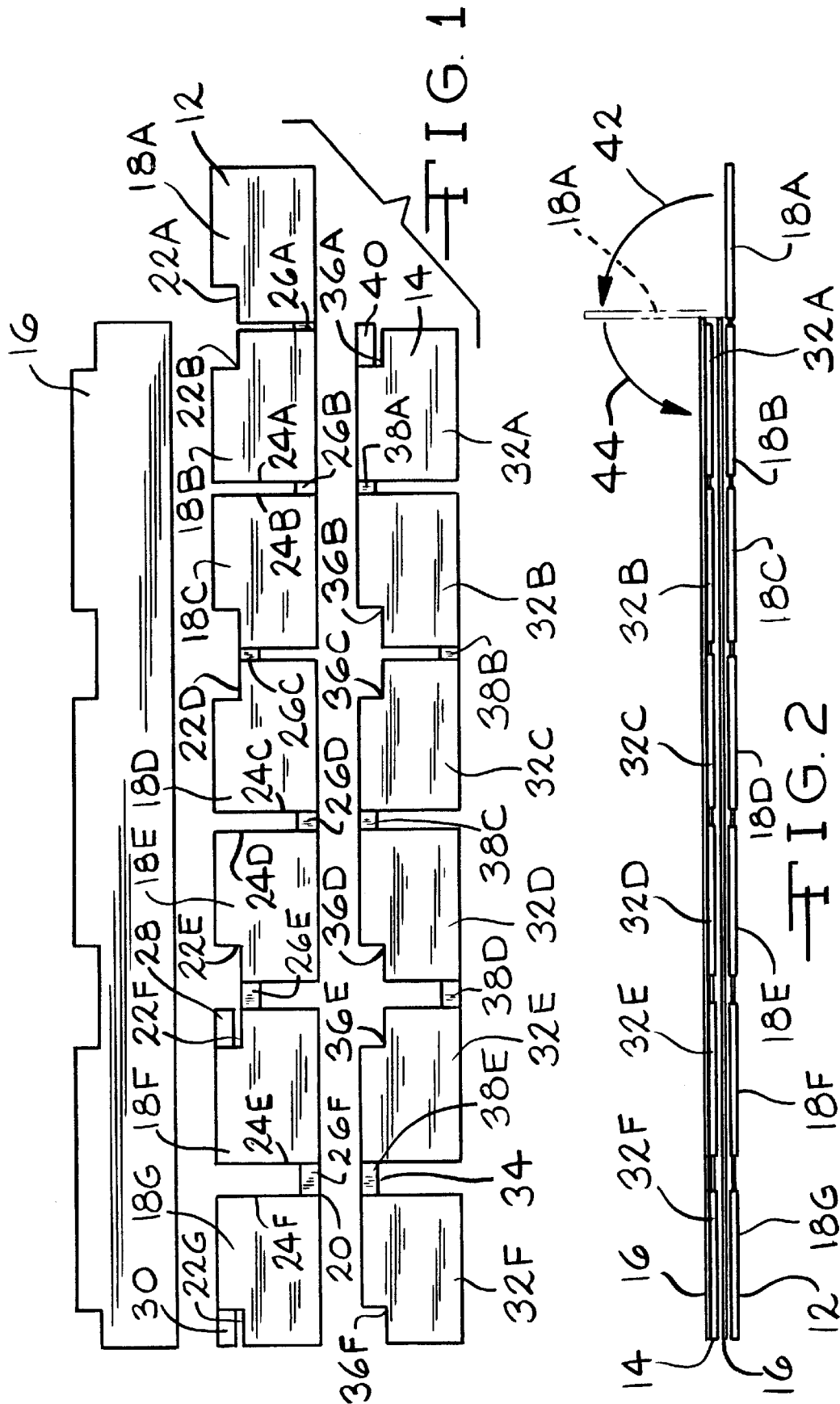

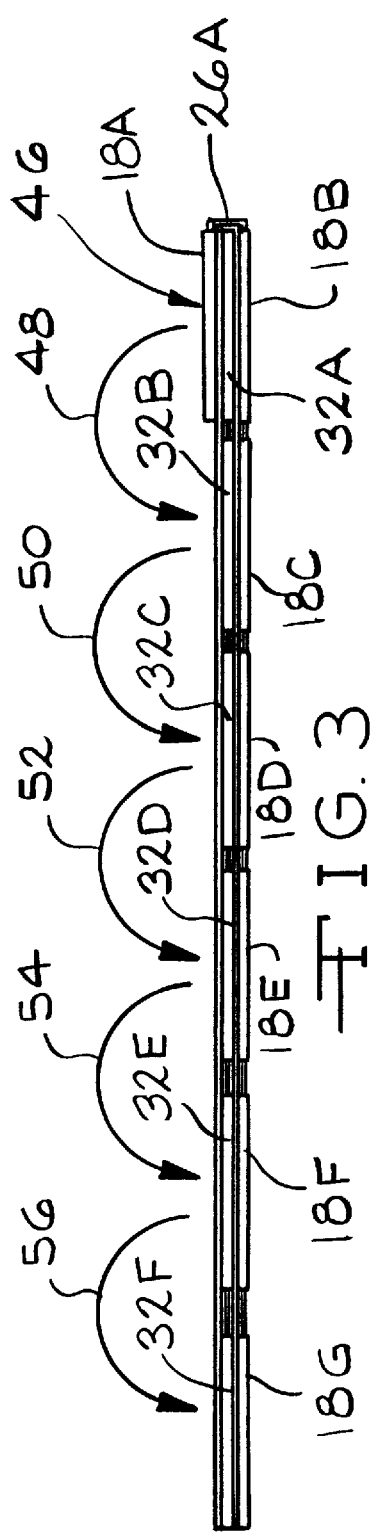
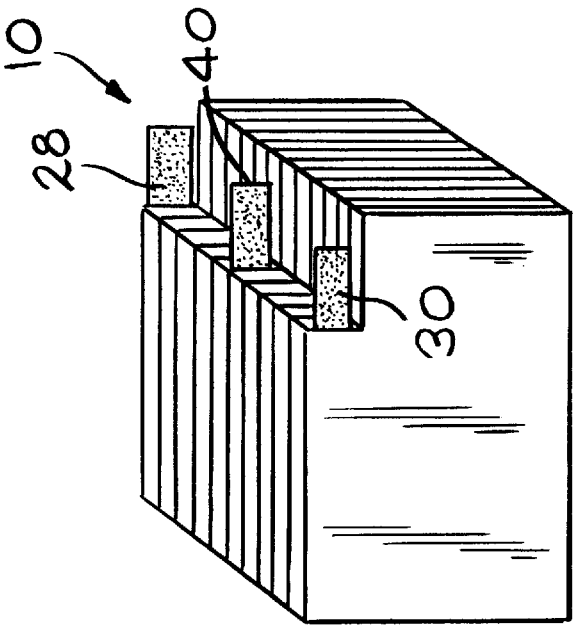
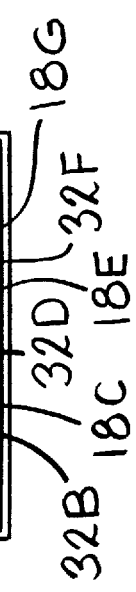

METHOD FOR PROVIDING A FLAT-FOLDED, MULTI-PLATE ELECTRODE ASSEMBLY

CROSS-REFERENCE TO RELATED APPLICATION

This application is a divisional of application Ser. No. 08/885,085, filed Jun. 30, 1997 now U.S. Pat. No. 5,776,628 to Kraft et al.

BACKGROUND OF THE INVENTION

1. Field of Invention

The present invention generally relates to the art of electrochemical energy, and more particularly, to a unique flat-folded, multi-plate electrode assembly that is generally applicable to energy storage devices of non-cylindrical or non-jellyroll configurations. Advantageously, the flat-folded, multi-plate electrode design of the present invention reduces the number of individual components and the number of mechanical connections required between the anode and cathode electrodes and their respective battery terminals. In that manner, the present invention simplifies the assembly process in a multi-plate electrochemical power source and is adaptable in a wide variety of electrode configurations and shapes for such applications as capacitors including electrolytic capacitors, ceramic capacitors, foil capacitors, super capacitators, double layer capacitators, and batteries including aqueous and nonaqueous primary and secondary batteries.

2. Prior Art

Wound batteries are a typical electrode configuration formed of a continuous anode and a continuous cathode assembly laid one on top of the other and wound into a jellyroll. Such an electrode configuration is desirable because the continuous anode and cathode electrodes require a minimal number of mechanical connections to their respective terminal leads, and the jellyroll assembly is generally recognized as preferred for high discharge and current pulse applications.

However, in some applications, a cylindrically shaped electrode assembly is not desired. Instead, a battery is required that fits inside of a casing having at least two spaced apart and planar side walls joined by end walls. Such prismatic shaped casings are commonly used to house multi-plate battery assemblies. A typical multi-plate battery assembly consists of a series of individual cathode plates inserted between an accordion folded, continuous anode in electrical contact with the casing. The cathode plates are then joined mechanically, such as by welding a series of leads to each of them and then connecting the leads to a bus. Not only does the typical multi-plate battery assembly require many individual components but the assembly process can be very time consuming.

What is needed is a multi-plate electrode assembly that includes many of the desirable features of the jellyroll wound configuration such as unitary anode and cathode electrodes, but that is provided in a shape that can be housed inside of a prismatic casing. The flat-folded, multi-plate electrode assembly of the present invention provides these advantages.

SUMMARY OF THE INVENTION

The flat-folded, multi-plate electrode assembly of the present invention is intended to be housed inside of a prismatic case and includes anode and cathode active materials supported on respective current collectors. The current collectors are preferably continuous, but may be formed of segments joined together to form a unitary member. The active materials of each electrode are provided as discrete portions spaced from each other at progressively increasing intervals along the length of the respective current collectors. The intermediate portions of the current collectors devoid of active materials allow for the increase in cell thickness from the center to the outside of the assembly as the electrodes, separated by an insulating material, are aligned and then flat-folded along their length. The resulting multi-plate electrode assembly according to the present invention insures that active material interface between the electrodes occurs over the largest available surface. Integral tabs extend from each of the electrode current collectors for anode to case and cathode to terminal lead connection. There can be single or multiple leads depending on electrical requirements and battery configuration.

The foregoing and additional advantages and characterizing features of the present invention will become clearly apparent upon a reading of the following detailed description together with the included drawings.

BRIEF DESCRIPTION OF THE DRAWING FIGURES

FIG. 1 is a plan view of the anode 12, cathode 14 and separator 16 before beginning of the assembly operation.

FIG. 2 is a side elevational view showing the first fold in the assembly operation.

FIG. 3 is a side elevational view of a partially assembled electrode assembly 10 according to the present invention.

FIG. 4 is a side elevational view of the finished flat-folded electrode assembly according to the present invention.

FIG. 5 is a perspective view of the flat-folded electrode assembly 10 showing the orientation of the anode tabs 28,30 and the cathode tab 40.

DETAILED DESCRIPTION OF THE INVENTION

Turning now to the drawings, FIGS. 1 to 5 show an electrode assembly 10 (FIG. 4) according to the present invention comprised of an anode electrode, generally indicated at 12, a cathode electrode, generally indicated at 14 and a separator 16 positioned between the anode and the cathode to prevent short circuit contact therebetween. Anode electrode 12 comprises a continuous, elongated element or structure, preferably of an anode active material such as an alkali metal provided in the form of plates 18A to 18G supported on contact portions (not shown) of a conductive member 20 serving as an anode current collector. Preferably the anode active material is contacted to both sides of the anode current collector 20.

Each of the anode plates 18A to 18G is generally in the shape of a rectangular sheet of the alkali metal having a step 22A to 22G provided at one of the plate corners. However, those skilled in the art will readily recognize that the rectangular shape is not necessary and that a myriad of other shapes for the anode plates are contemplated without departing from the scope of the present invention. In the present embodiment of the anode electrode 12, the step 22A of the first anode plate 18A faces the step 22B of the second anode plate 18B with the opposite edge 24A of the second plate facing the edge 24B of the third anode plate 18C. This pattern is repeated along the anode electrode 12 from the anode plates 18A to 18F. The last anode plate 18G has its edge 24F facing the edge 24E of plate 18F.

The anode current collector 20 is comprised of a conductive material such as of a conductive screen and the like having a shape similar to that of the anode plates 18A to 18G with anode connector portions 26A or 26E bridging between adjacent plates. The anode connector portions are preferably integral with the contact portions of the anode current collector 20 supporting the various anode plates. In particular, the anode current collector 20 includes the first anode connector portion 26A bridging between the contact portions supporting anode plates 18A and 18B. The first anode connector portion 26A is spaced from the steps 22A and 22B. The second anode connector portion 26B bridges between the current collector contact portions supporting anode plates 18B and 18C and in line with the first anode connector portion 26A. The third anode connector portion 26C bridges between the contact portions of the anode current collector supporting plates 18C and 18D, directly proximate the respective steps 22C and 22D. A fourth anode connector portion 26D bridges between the contact portions of the current collector supporting anode plates 18D and 18E and in line with the first and second anode connector portions 26A, 26B. A fifth anode connector portion 26E bridges between the current collector contact portions supporting anode plates 18E and 18F, directly proximate the respective steps 22E and 22F. Finally, a sixth anode connector portion 26F bridges between the contact portions of the anode current collector supporting plates 18E and 18F, and in line with the first, second and fourth anode connector portions 26A, 26B and 26D. The anode electrode 12 is further provided with a first tab 28 extending from the current collector adjacent to the step 22F of the fifth plate 18F and a second tab 30 adjacent to the step 22G of the seventh plate 18G.

While the tabs 28, 30 are shown extending along the longitudinal axis of the current collector, that is not necessary. There can be connector tabs extending from any one of the anode plates 18A to 18G, and the tabs can extend in both a horizontal and/or a vertical direction, as desired. At the least, one tab is required for connection to the anode terminal.

In the present embodiment, the connector portions 26A to 26E are of a reduced width as compared to that of the contact portions supporting the anode active material. This helps to conserve space inside the casing for active materials. In an alternate embodiment of the present invention, the connector portions extend the entire width of the current collector.

It will be apparent to those skilled in the art that while the anode electrode 12 is shown comprised of seven plates supported on respective current collector contact portions joined together by the intermediate connection portions, that is for illustrative purposes only. In that respect, the anode 12 can be comprised of the current collector 20 having a greater or a lesser number of contact portions supporting respective anode plates than the exemplary seven plates shown.

According to the present invention, the length of the sixth connector portion 26F is somewhat greater than that of the fifth connector portion 26E which in turn is somewhat greater than the length of the fourth connector portion 26D which is somewhat greater in length than that of the third connector portion 26C which is somewhat greater in length than that of the second connector portion 26B which in turn is somewhat greater in length than that of the first connector portion 26A. The relationship between the lengths of the various connector portions will be explained in greater detail hereinafter.

In a similar manner as the anode electrode 12, the cathode electrode 14 is a continuous structure provided with plates 32A to 32F of active material contacting a conductive member 34 serving as a cathode current collector. The cathode plates 32A to 32F are preferably of a metal, a metal oxide, a metal sulfide, a mixed metal oxide or a carbonaceous material, and are generally in the shape of rectangles provided with respective steps 36A to 36F. The cathode plates are sized and configured to overlay the second to the seventh anode plates 18B to 18E. As with the anode plates 18A to 18G, the rectangular shape is not required, however, the shape of the respective anode and cathode plates must be similar so that when the electrodes are laid one on top of the other, they substantially cover each other. The cathode current collector 34 is comprised of a conductive material such as of a conductive screen and the like having a shape similar to that of the cathode plates 32A to 32F with cathode connector portions 38A to 38E bridging between adjacent plates. The cathode connector portions are preferably integral with the contact portions (not shown) of the cathode current collector 34 supporting the various cathode plates.

In particular, the cathode current collector 34 includes the first cathode connector portion 38A bridging between the contact portions supporting cathode plates 32A and 32B. A step 36A and an adjacent tab 40 extend from the opposite side of the cathode plate 38A. A second cathode connector portion 38B bridges between the current collector contact portions supporting cathode plates 32B and 32C, spaced from respective steps 36B and 36C facing each other. A third cathode connector portion 38C bridges between the contact portions of the cathode current collector supporting plates 32C and 32D and in line with the first cathode current connector portion 38A. A fourth cathode connector portion 38D bridges between the contact portions of the current collector supporting cathode plates 32D and 32E, spaced from respective steps 36D and 36E facing each other and in line with the second cathode connector portion 38B. Finally, a fifth cathode connector portion 38E bridges between the contact portions of the cathode current collector supporting plates 32E and 32F in line with the first and third connector portions 38A, 38C. A step 36F is provided in the sixth cathode plate 32F, opposite the fifth connector portion 38E.

As is the case with the anode electrode 12, the cathode connector portions 38A to 38E of the cathode electrode 14 are preferably of a reduced width as compared to that of the contact portions supporting the cathode active material. This helps to conserve space inside of the casing for active materials. Also, there can be more cathode tabs than tab 40 shown, and the tabs can extend from the current collector 34 in either a vertical or a horizontal orientation, as desired.

Separator sheets 16 (only one shown in FIG. 1) are provided having a configuration and shape sized somewhat larger than that of the cathode 14 including the connector portions extending between the cathode plates. That way, the separator sheets 16 are positioned on either side of the cathode and heat sealed or otherwise joined about their peripheries to completely envelope the cathode 14.

As shown in FIG. 2, the separator enveloped cathode 14 is then positioned overlaying the anode 12 beginning at the second anode plate 18B. In that manner, the first cathode plate 32A covers the second anode plate 18B, the second cathode plate 32B covers the third anode plate 18C, the third cathode plate 32C covers the fourth anode plate 18D, the fourth cathode plate 32D covers the fifth anode plate 18E, the fifth cathode plate 32E covers the sixth anode plate 18F and the sixth cathode plate 32F covers the seventh anode plate 18G.

With the cathode 14 thus overlaying the anode 12, the various cathode connecting portions 38A to 38E are offset or spaced from the respective anode connecting portions 26B to 26F. Then, the first anode plate 18A is folded up, as indicated by arrow 42, and over the first cathode plate 32A, as indicated by arrow 44, so that the first cathode plate 32A is disposed intermediate the first and second anode plates 18A, 18B to form a first sandwich configuration 46 (FIG. 3). According to the present invention, the first anode connector portion 26A has a length only somewhat greater than the thickness of the first cathode plate 32A to allow for the flat-folded anode/cathode/anode sandwich configuration 46. As indicated by arrow 48, the first sandwich configuration 46 is then flat-folded onto the second cathode plate 32B overlaying the third anode plate 18C to form a second sandwich configuration (not shown) having the second anode plate 18B overlaying the first cathode plate 32A which in turn overlays the first anode plate 18A overlaying the second cathode plate 32B which in turn overlays the third anode plate 18C. In that manner, the second anode connector portion 26B and the first cathode connector portion 38A are of a similar length somewhat greater than the thickness of the first sandwich configuration 46 to thereby provide the second sandwich configuration. As indicated by arrows 50 to 56 in FIG. 3, this flat-folding pattern is continued until the anode 12 and the cathode 14 have been completely folded upon themselves to provide the flat-folded, multi-plate electrode assembly 10 shown in FIG. 4.

According to the present invention, the length of the various anode connectors 26A to 26F and the length of the various cathode connectors 38A to 38E increase along the extent of the anode 12 and the extent of the cathode 14 from their respective first plates 18A, 32A to their last plates 18G, 32F to accommodate the progressively increasing flat-folded thickness of the electrode assembly 10, as indicated by arrows 48 to 56. Thus, the completed flat-folded electrode assembly 10 shown in FIG. 4 comprises the following electrode plate sequence moving from the top of the drawing down: anode plate 18F/cathode plate 32E/anode plate 18D/cathode plate 32C/anode plate 18B/cathode plate 32A/anode plate 18A/cathode plate 32B/anode plate 18C/cathode plate 32D/anode plate 18E/cathode plate 32F/anode plate 18G.

FIG. 5 shows the position of the anode tabs 28,30 and the intermediate cathode tab 40 of the completed, flat folded electrode assembly 10 intended to be housed inside of a conductive casing (not shown), preferably of a prismatic shape. The anode tabs are provided for connection to the conductive casing while the cathode tab is positioned for connection to the terminal lead (not shown) in a typical case-negative cell design, which is the preferred construction for the cell of the present invention.

By way of example, in an illustrative battery according to the present invention, the anode active material is an alkali metal selected from Group IA of the Periodic Table of Elements and contacted to a nickel current collector, and the cathode active material is of a carbonaceous material, fluorinated carbon, metal, metal oxide, mixed metal oxide or a metal sulfide, and mixtures thereof. Preferably, the cathode material is mixed with a conductive diluent such as carbon black, graphite or acetylene black or metallic powders such as nickel, aluminum, titanium and stainless steel, and with a fluoro-resin powder binder material such as powdered polytetrafluroethylene or powdered polyvinylidene fluoride. The thusly prepared cathode active admixture is contacted to the cathode current collector which is a thin sheet or metal screen, for example, a titanium, stainless steel, aluminum or nickel screen.

The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include woven and non-woven fabrics of polyolefinic fibers or fluoropolymeric fibers including polyvvylidine fluoride, polyethylenetetrafluoroethylene, and polyethylenechlorotrifluoroethylene laminated or superposed with a polyolefinic or a fluoropolymeric microporous film. Suitable microporous films include a polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.). The separator may also be composed of non-woven glass, glass fiber materials and ceramic materials.

The exemplary battery of the present invention having the flat-folded electrode assembly is activated with an ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, electrolytes suitable for the present invention include both aqueous and nonaqueous solutions that are substantially inert to the anode and cathode materials, and that exhibit those physical properties necessary for ionic transport, namely, low viscosity, low surface tension and wettability.

By way of example, a suitable electrolyte for an alkali metal active anode has an inorganic or organic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The ionically conductive salt serves as the vehicle for migration of the anode ions to intercalate or react with the cathode active material. Preferably the ion-forming alkali metal salt is similar to the alkali metal comprising the anode.

The preferred form of the flat-folded electrode assembly of the present invention is a case-negative design wherein the anode/cathode couple is inserted into a conductive metal casing such that the casing is connected to the anode current collector via anode tabs 28 and 30 (FIG. 5), as is well known to those skilled in the art. A preferred material for the casing is titanium although stainless steel, milled steel, nickel-plated milled steel and aluminum are also suitable. The casing header comprises a metallic lid having a sufficient number of openings to accommodate the glass-to-metal seal/terminal pin feedthrough connected to the cathode electrode 14 via tab 40 (FIG. 5). The anode electrode 12 is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto.

The cell of the present invention can also be constructed in a case-positive design. Further, the flat-folded, multi-plate electrode assembly of the present invention is readily adaptable to secondary, rechargeable electrochemical chemistries.

It is appreciated that various modifications to the invention concepts described herein may be apparent to those skilled in the art without departing from the spirit and the scope of the present invention defined by the hereinafter appended claims.

What is claimed is:

1. A method for providing a battery, comprising the steps of:

a) providing an anode comprising an anode current collector having a plurality of anode connector portions bridging between adjacent anode contact portions of the anode current collector provided with an anode active material contacted thereto to thereby provide anode plates connected by the anode connector portions, and including providing the anode connector portions of an increasingly greater length from a first anode plate progressing to a last anode plate;

b) providing a cathode electrode comprising a cathode current collector having a plurality of cathode connector portions bridging between adjacent cathode contact portions of the cathode current collector provided with a cathode active material contacted thereto to thereby provide cathode plates connected by the cathode connector portions, and including providing the cathode connector portions of an increasingly greater length from a first cathode plate progressing to a last cathode plate;

c) disposing a separator between the anode electrode and the cathode electrode juxtaposed one on top of the other to provide a flat foldable anode and cathode electrode overlay;

d) folding a first plate of one of the anode electrode and the cathode electrode on top of a second plate of the other of the anode electrode and the cathode electrode with a first connector portion of the one folded cathode plate or anode plate of a length greater than a thickness of the other of the anode electrode or the cathode electrode to thereby provide a first folded electrode configuration and further including folding the first folded electrode configuration on top of a next anode and cathode electrode overlay with the connector portions of the anode electrode and the cathode electrode intermediate the first folded electrode configuration and the next anode and cathode electrode overlay having lengths sufficient to provide for a combined thickness of a subsequent folded electrode configuration consisting of the first folded electrode configuration and the next anode electrode and cathode electrode overlay and still further providing the respective successive connector portions connecting between the subsequent folded electrode configuration and the successive anode plates and the successive cathode plates of the electrode overlay of a progressively greater length accommodating an ever increasing thickness of a resultant folded electrode configuration folded to the last anode plate and the last cathode plate of the electrode overlay; and e) activating the operatively associated anode electrode and the cathode electrode with an electrolyte provided in a casing housing the battery.

2. The method of claim 1 including folding the first plate of the one of the anode electrode and the cathode electrode on top of a second plate of the other of the anode electrode and the cathode electrode as a first anode plate.

3. The method of claim 1 including providing the anode electrode consisting of one more anode plate than the cathode electrode consists of cathode plates.

4. The method of claim 1 including providing the anode electrode as a unitary member.

5. The method of claim 1 including providing the cathode electrode as a unitary member.

6. The method of claim 1 including selecting the cathode active material from the group consisting of a carbonaceous material, a fluorinated carbon, a metal, a metal oxide, a metal sulfide and a mixed metal oxide, and mixtures thereof.

7. The method of claim 1 including providing the cathode electrode further comprising at least one of a binder material and a conductive additive.

8. The method of claim 7 including providing the binder material as a fluoro-resin power.

9. The method of claim 7 including selecting the conductive additive from the group consisting of carbon, graphite powder, acetylene black and metallic powder selected from the group consisting of titanium, aluminum, nickel and stainless steel, and mixtures thereof.

10. The method of claim 1 including providing the anode electrode comprised of a Group IA metal.

11. The method of claim 1 including providing the electrolyte activating the anode electrode and the cathode electrode comprising an ion-forming alkali metal salt dissolved in a nonaqueous solvent, wherein the alkali metal of the salt is the same as an alkali metal comprising the anode electrode.

12. The method of claim 1 including selecting the casing from the group consisting of titanium, stainless steel, milled steel, nickel-plated milled steel and aluminum, and mixtures thereof.

* * * * *